United States Patent [19]
Davis

[11] Patent Number: 4,913,551
[45] Date of Patent: Apr. 3, 1990

[54] LOG MEASURING METHOD AND APPARATUS

[76] Inventor: Richard B. Davis, 711 "H" St., Crescent City, Calif. 95531

[21] Appl. No.: 78,856

[22] Filed: Jul. 28, 1987

[51] Int. Cl.$^4$ .............................................. G01B 11/02
[52] U.S. Cl. ....................................... 356/383; 356/2; 356/379
[58] Field of Search ...................... 356/1, 2, 379, 380, 356/383; 250/558; 358/107

[56] References Cited

U.S. PATENT DOCUMENTS

| | | | |
|---|---|---|---|
| 3,565,531 | 2/1971 | Kane et al. | 356/381 |
| 3,619,070 | 11/1971 | Pirlet | 358/107 |
| 3,802,774 | 4/1974 | Eschler | 356/1 |
| 4,358,960 | 11/1982 | Porter | 356/381 |
| 4,375,921 | 3/1983 | Morander | 250/560 |

FOREIGN PATENT DOCUMENTS

191908 11/1983 Japan ................................. 356/383

*Primary Examiner*—Richard A. Rosenberger
*Attorney, Agent, or Firm*—Terrance L. Siemens

[57] ABSTRACT

A method and apparatus for measuring the total volume of a group of elongated objects, such as a load of logs on a transport vehicle, is described. Each end of the load is imaged on photographic film with two cameras whose geometric lens characteristics, separation distance, and focal lengths are known. The imaging can be done before, during or after the unloading of the logs from the vehicle. A specially modified stereographic projector mounting all four film images and using digital output devices is then used to transfer the information, permanently stored on the images, to a digital computer. The computer is used to transform the dimensions of the three dimensional stereo image produced by the stereographic projector to the real world dimensions in which the photographic images were originally produced. The computer, in turn, calculates the length of each log, the cross sectional area of the wood (excluding bark) at each end of each log, the volume of wood on the load, etc. and then prepares a report containing the volumetric and other pertinent data. The method is equally applicable whether the objects being measured are exposed or hidden along their length. Note the wood in natural logs is hidden along the length by the bark. The scope of the invention extends far beyond this specific application to the lumber industry, and several such pontential applications are discussed.

15 Claims, 5 Drawing Sheets

LOG MEASURING METHOD AND APPARATUS

FIELD OF THE INVENTION

This invention broadly relates to the field of photographic measurement. More specifically, it addresses the difficult problem of volumetric measurement of elongated prismoidal, frustoconical, or cylindrical objects while they are arranged in groups, such as bundles or piles, or individually. A large number of objects can be nearly completely hidden from view by their neighbors when stacked in piles or collected together in bundles. This makes manual measurement difficult and inaccurate and, prior to my invention, made any sort of automated measurement next to impossible and even more inaccurate. A key novelty of this photographic measuring system is the ability to accurately measure the length of an object or group of objects without actually tape scaling, viewing, photographing, or in any way traversing or sensing that length. Just how this is done will be fully described later. For now, that feature is mentioned to assist in adequately portraying the scope, and therefore the many potential fields of this invention. The list of possible uses for this invention is virtually endless. The numerous types of material capable of being measured by this unique method and apparatus make this invention capable of application to nearly any field of endeavor where accurate and reproducible volumetric or length data is needed. It is contemplated that items whose length is inaccesible, such as nuclear reactor control rods, could be easily and accurately be monitored using this invention. Exceedingly long items, such as bridge beams or even railroad trains, can be precisely measured. The accuracy of this invention is in no way diminished by the magnitude of the length being measured.

A few examples of other items easily measured with this invention are: all types of motor vehicles; railroad ties in bundles or piles; machine bar stock either in open piles or enclosed in shipping cartons; billets and slabs in steel rolling mills; telephone poles; the lumber (exclusive of bark) in logs in piles or loads; stacked or palletized items of inventory such as might be found at a factory; items that have been pigeonholed as in an automated warehouse; building materials such as stacked bricks, beams, panels, or planks; and a myriad of other items too numerous to mention specifically.

Thus, as can be seen, this invention is applicable to at least the broad industries of transportation, manufacture, energy, warehousing, building, and lumber. The majority of this specification will describe in detail a preferred application of the invention in the lumber industry. That application involves the determination of the volume of lumber delivered by a log transporting truck or train to the millsite exclusive of bark. However, it is to be understood that the scope of this invention far exceeds the particular industrial embodiment here described.

More particularly, the preferred embodiment of this invention relates to the measurement or "scaling" of logs either during or immediately after their transport from the forest to the millsite or place of storage. The term "scaling" is an art term used in the logging industry and is not to be confused with the more common use of the word meaning the simple weighing of an object. The principles of stereographic photography and projection as well as computer technology are combined in a unique manner to accomplish the goals and objects of this invention.

BACKGROUND OF THE INVENTION

Stereographic photography, or the taking of two pictures of an object from different positions so as to create a three-dimensional image thereof, is well known. At least as early as World War II, the principles and apparatus thereof were commonly used to survey enemy positions and strengths. The human eyes, along with the image merging capabilities of the brain, serve as another well known example of the process. A commonly available toy, the "Viewmaster", offers a simple, but effective, demonstration of the the efficacy and development of this art. Not as well known, but still within the purview of one skilled in the art, is the fact that two such photographs may be conjointly analysed so as to actually measure the third dimension which recedes from or approaches the cameras. Stereographic projectors are often used in such endeavors.

This depth measuring capability has, heretofore, not been utilized to its fullest extent. For example, the exact distance of an of one end of an object, with respect to a set of stereo cameras, can be accurately determined. The exact distance from the other end of those objects can also be accurately determined by a second set of stereo cameras. If, in addition, the exact distance between the two sets of stereo cameras is known, and the objects have a predictable variation in cross section along their length, the exact lengths and volumes of the objects can be easily determined.

Log scaling, or the measurement of the length, diameters, and therefore, volume of logs, has not changed for over 50 years. Typically, logs are purchased by volume and transported to the millsite where each load of logs is scaled to determine the incoming volume. This process is currently performed by one or more persons (scalers) who physically and manually measure each log on the load. Scalers must measure all critical dimensions of every log in order to determine accurately the volume of lumber in that log. It should be mentioned that this does not simply mean measuring a single length and diameter of each log and then computing its volume based on the assumption that it is a right circular cylinder. Rather, logs are often thicker at one end than the other, thus requiring a diameter measurement at each end. For this reason, at least two scalers are usually employed. Additionally, the ends of a log may not be a true circular cross-section but may be elliptical or oval. The butt ends of the log may not be perpendicular to its longitudinal axis. Scalers are also required to judge the quality of the logs as to type, texture, density, grain, and other aspects. All these elements combine to require that a scaler be a highly skilled workman possessing expertise in estimation and experience in judgement. It comes as no surprise that scalers often command a high rate of pay. Nevertheless, the accuracy and reproducibility of manual scaling remains poor because of the inherent difficulty of the job.

Scaling is normally done while the logs are on the transport vehicle. Many times manual scaling is done at both the pickup and the delivery site. For example, the logs may be scaled by the U.S. Forest Service to determine the amount of lumber taken from the forest and scaled again at the millsite to determine the amount entering the mill. Therefore, an expensive delivery vehicle and its crew can be idle for over an hour per load. The magnitude of the problem becomes clear when it is realized that a hundred thousand dollar truck cannot achieve the delivery productivity for which it was designed because of this enforced idleness.

Under the current state of the art, only a handwritten or hand entered tally of the scale information is preserved. This tends to impugn the integrity of any later verification or audit of the contents of any given load. If a mistake is made on a tally sheet the error is not capable of being rectified at a later date. This can become a source of dispute between users, suppliers, and carriers of the logs.

It can be seen that present systems of measurement, in particular the system of log scaling, suffer from many disadvantages. My invention, particularly applicable to log scaling, but not limited thereto, overcomes all the previously mentioned disadvantages as well as providing significantly greater accuracy and reproducibility than any known system.

SUMMARY OF THE INVENTION

A major goal of this invention to provide means to quickly, easily, and accurately measure the length of an elongated object or group of objects without actually tape scaling, scanning, viewing, photographing, or in any way traversing or sensing that length. Another goal is to provide means for computing the actual volume of each object in such a group and, by summation, the total volume. Another goal is to make these measurements in such a way that a permanent, indisputable, and reproducible record of the measurement is created. A more specific goal is to substantially reduce or eliminate entirely delays caused by the present system of manual log scaling. Another specific goal is to free the log scalers from the backbreaking aspect of their jobs and allow them to concentrate on the things only they can do, such as grading quality.

It is submitted that the present invention meets or exceeds all the above goals. Stereo photographs are taken of each end of a load of logs. The logs are photographed at a point in time when the transport vehicle is normally momentarily stopped, such as at the entry point to the mill or at the unloading site. It is not necessary to additionally stop the vehicle, such as at a scaling station, to capture the imagery from which the measurements of the diameter, length, and volume of the logs can be made.

By utilizing precision cameras, whose orientation to one another and whose lens characteristics are precisely known, the measurement of the length and diameters of the individual logs can be made from the resulting photography. This can be done with greater speed and accuracy than any current method.

This invention, through the designed placement and orientation of the taking cameras, captures not only the imagery of the logs, but also the imagery of the delivery truck or train, plus a data display containing other information; such as date, time of day, load number, location, and any other information deemed necessary. A separate video camera may be utilized for this purpose, or the data board could be in the field of view of one of the stereo cameras. As neither stable base film nor video images change over time, and since time tested and proven principles of geometry and photogrammetry are used to derive the dimensions from the photography, all of the measurements can be verified at a later date by independent persons.

This invention additionally utilizes unique adaptations of an otherwise conventional direct optical projection stereo-plotter in combination with encoders, digitizers, and a computer to transform the photographic images to a final measurement of the total volume of the material.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
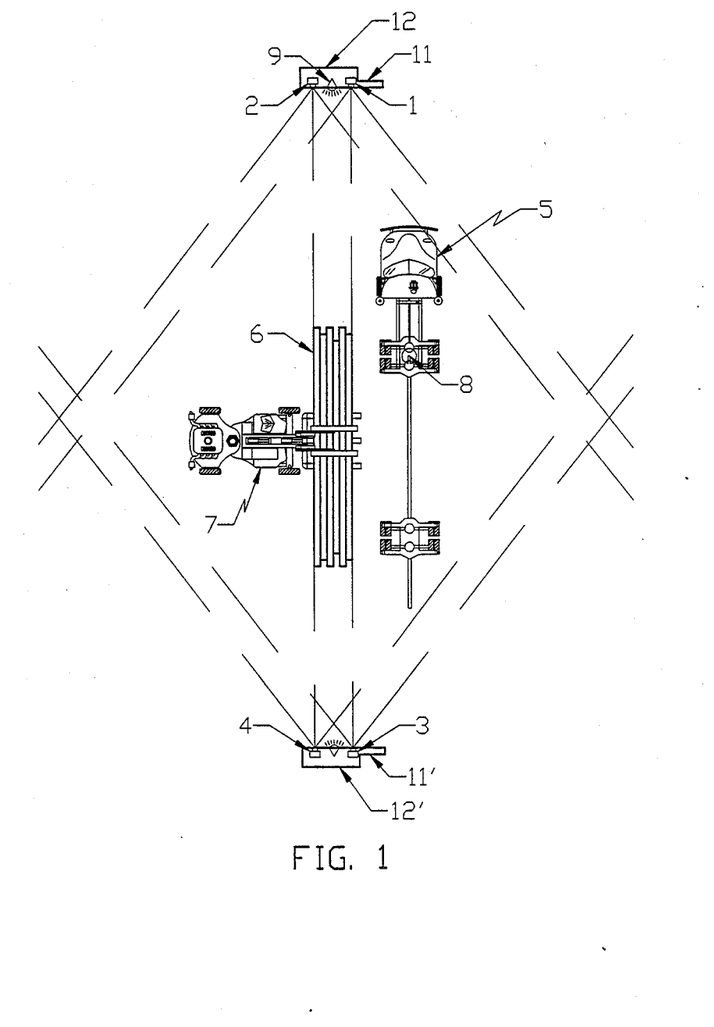
FIG. 1 is a top view of the invention showing a load being scaled during unloading from a transport vehicle.
Figure 4:
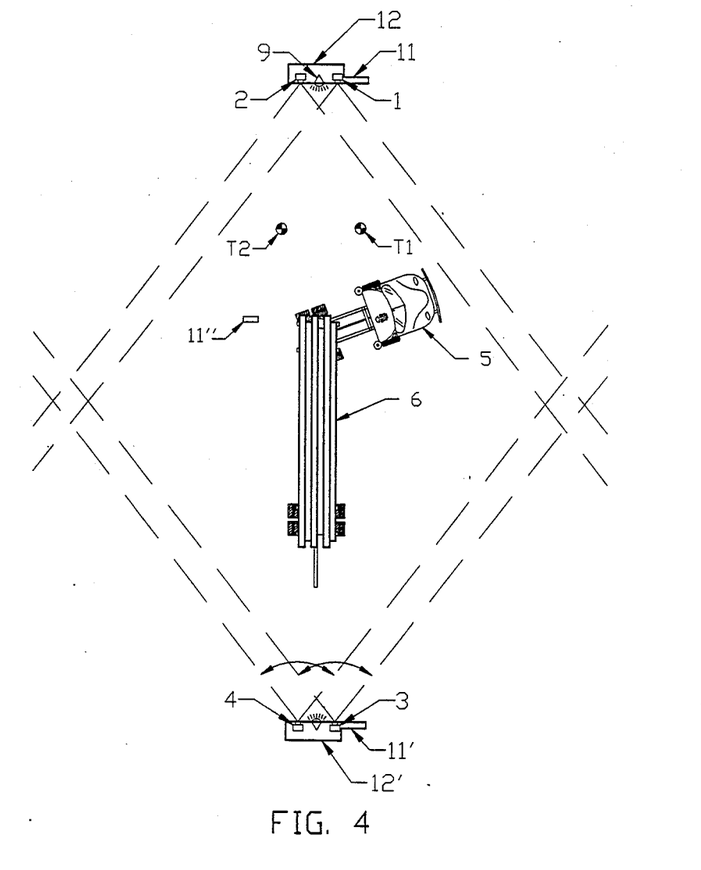
FIG. 4 is a top view of the invention showing a load being scaled while on the transport vehicle.

Referring first to FIG. 1, there is shown a logging truck 5 having its load 6 removed by unloader 7. The conventional unloader 7 is capable of lifting the entire load of logs at once. Truck 5 is also conventional, with its front cab portion articulated to the rear load carrying portion somewhere near point 8. Note that point 8 is somewhat to the rear of the front of the normal log load 6. This is important in exposing the front of the logs to view without unloading as seen in FIG. 4. Cameras 1-4 are positioned strategically so as to simultaneously photograph each end of the load. This may be done while the logs are being unloaded, as in FIG. 1, while they are spread upon the ground, as for other inspection, or while they are still on the transport vehicle, as in FIG. 4. The only requirement is that the ends of the logs be clearly visible to the cameras.

In FIG. 1 cameras 1 and 2 are shown mounted in scale house 12 to view the front of the load and cameras 3 and 4 are mounted in a similar scale house 12' to view the rear. Also available are floodlights to illuminate the ends of the load. These may be mounted in the scale house as at 9, or they may be a conventional portable variety. Of key importance to the later measuring of the logs, that will be done from these photographs, is the orientation of the cameras with respect to one another. The four cameras should be identical in format size and focal length. The front and rear cameras must be parallel in all respects to one another, and the separation of the two front cameras must be identical with that of the rear cameras. When these conditions are met, the overall error in this measuring method can be as small as 1 part in 5000. The average length log of around 40 feet can be measured to within a quarter of an inch.

Also visible in FIG. 1 are data boards 11 and 11' whose information is also made a permanent part of the photographic record. As mentioned earlier, the data boards contain information, such as date, time of day, load number, location, and any other information deemed necessary.

The angled lines emanating from each of the cameras in FIG. 1 represent the respective fields of view of those cameras. It should be noted that the positioning of the cameras in FIG. 1 allows them to record even more information than that already mentioned. For example, it can be seen that camera 1 has a clear view of the front end of the delivery truck. From this view, information such as license plate number, etc. can be recorded. Between all four cameras a complete record is made of each vehicle and the exact load being delivered.

Figure 2:
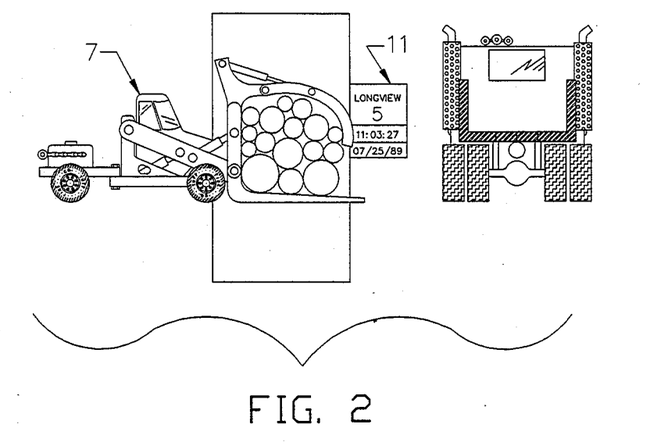
FIG. 2 is an end view as seen from the rear of the load of FIG. 1.
Figure 3:
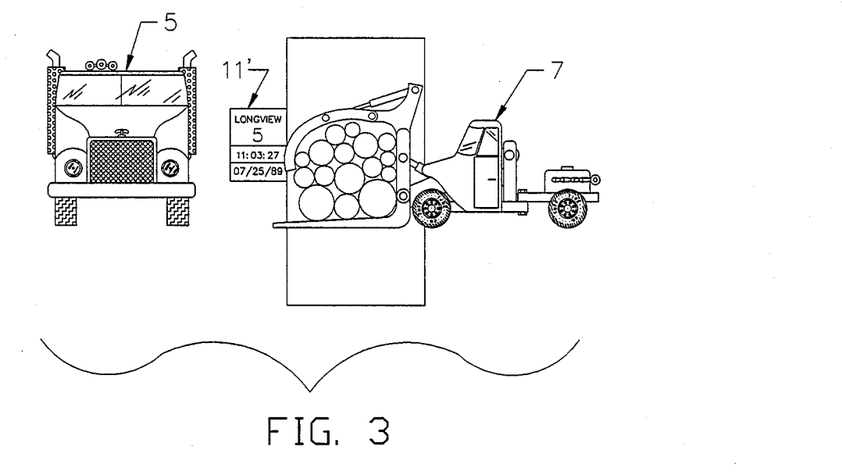
FIG. 3 is an end view as seen from the front of the load of FIG. 1.

FIGS. 2 and 3 show the views as seen from the rear and front, respectively. The portions of these views that are capable of stereoviewing are those that lie within the field of view of both cameras at that end. Such an area is shown schematically by the dashed rectangle 10 in FIG. 2. Also, the faces of data boards 11 and 11' can be seen.

It should be understood that the particular setup shown in FIGS. 1-3 is capable of many variations well within the purview of one of ordinary skill in the art. For example, the scale houses 12 and 12' might be either permanent structures or of a portable variety capable of calibration in the field. The truck and unloader shown are in no way intended to limit the scope of the invention to such. For example, the truck could as well be a railroad car; and the unloader, an overhead crane or straddle truck.

Turning now to FIG. 4, an embodiment is shown with a log load 6 being photographed while still on transport vehicle 5. Cameras 1-4 are shown only schematically in this view but it is to be understood the same geometric conditions apply as previously described. An alternately positioned data board 11" can also be seen. Typically, this situation would occur at the entrance to a plant site. Normally, a yard superintendant walks around the truck and makes a visual inspection of the load. Since the vehicle is normally stopped for this inspection, the driver would be guided by paint marks or other references on exactly where and how to position the truck before stopping. He would turn sharply or "jackknife" the log load at an approximately 70 degree angle from the cab of the truck, thereby making the front end of the load visible to the cameras. The yard superintendant would place small (4"×4") colored stickers on the end of one or more logs designating such things as load destination, species, load number, and other information deemed necessary.

At the completion of the superintendant's inspection, the "Photo-Scale" operator would illuminate the front and rear of the load with floodlights and trigger all four cameras (front and rear) simultaneously. When the floodlights are turned out, the truck would be released to proceed on its way. The total time for inspection and photography is typically less than three minutes.

Also visible in FIG. 4 are several surveyed target poles such as T1, T2, etc. They are placed strategically within the field of stereoscopic viewing and their markings and positioning with respect to the cameras are precisely known. The images of these poles are useful at a later time when the actual measurement will be made from the photograph.

At the end of each shift, the exposed color film is collected, labeled, and transported to a developing site where it will be processed to a positive image, left in rolls without cutting, and delivered to the measuring and analysis station.

Figure 5:
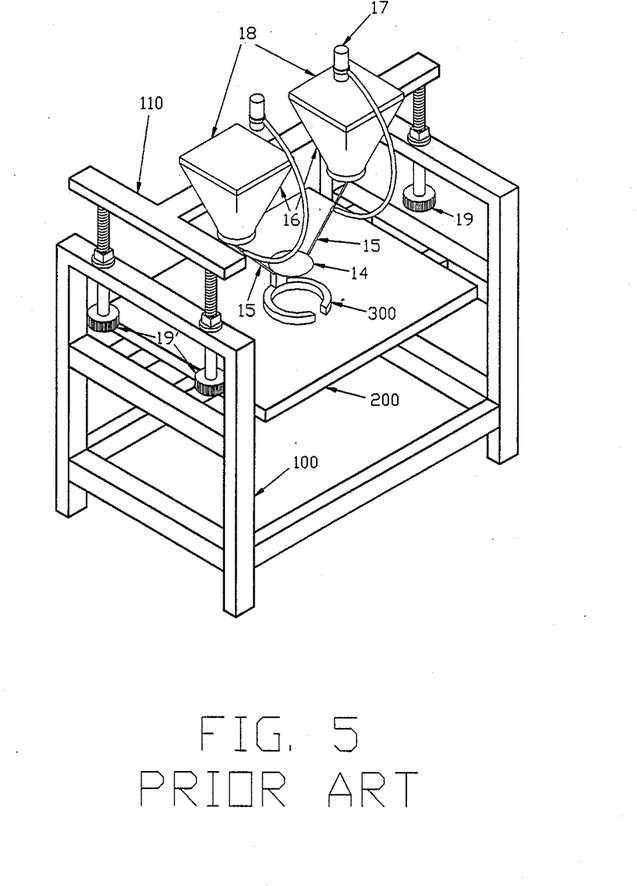
FIG. 5 is a perspective view of a typical conventional direct optical projection stereoplotter.
Figure 6:
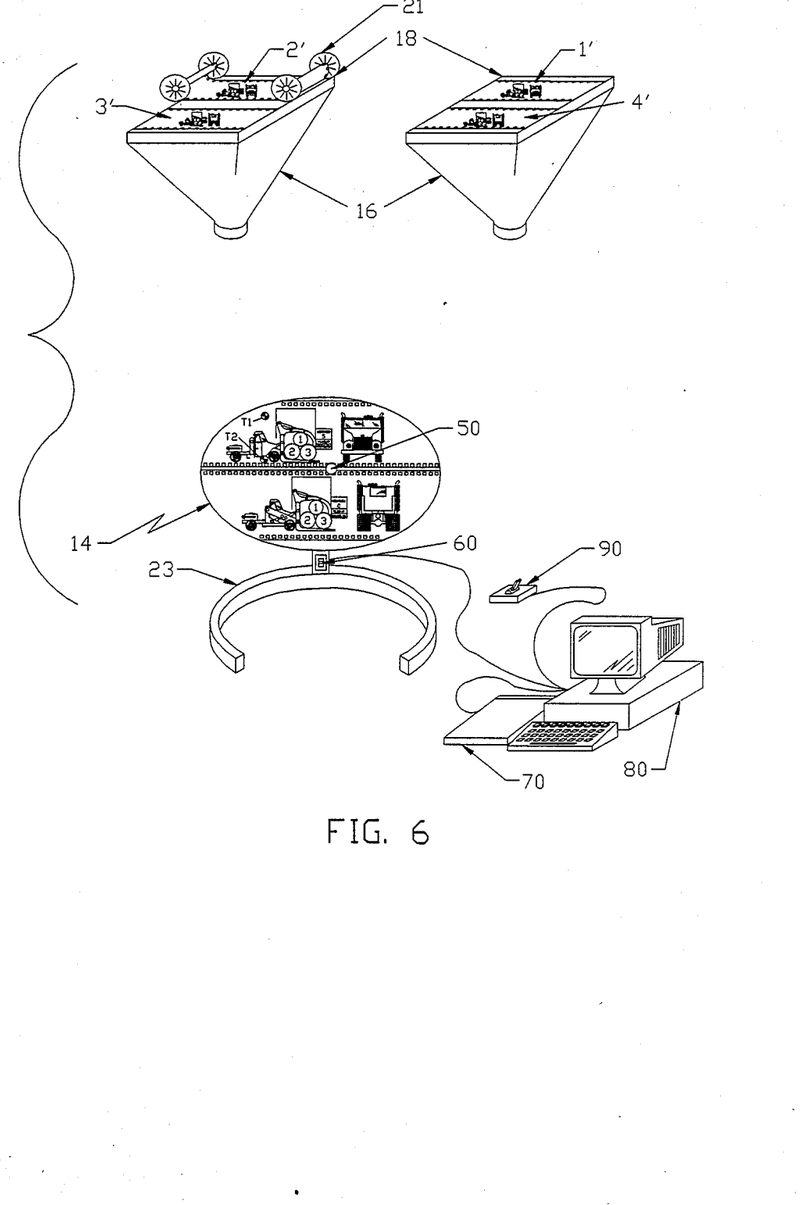
FIG. 6 illustrates special adaptations to a conventional stereoplotter for use with this invention.

The process by which the developed film is transformed into actual measurements of length and volume will now be described with reference to FIGS. 5 and 6. FIG. 5 is a perspective view of typical optical projection stereoplotter which has been adapted for use with this invention as shown in FIG. 6. The direct optical projection stereoplotter of FIG. 5 consists of main frame 100 which supports projectors 16 rigidly in place, thereby maintaining orientation of a stereomodel over long periods of time. Reference table 200 is a large smooth surface which serves as the vertical datum to which model elevations are referenced and which also provides the surface upon which a manuscript map is usually compiled. Platen 14 and a tracing pencil are usually attached to the tracing table 300. Platen 14 forms the viewing screen which also contains the reference mark. Guide rods 15 drive the illumination lamps 17 so as to cause projected rays to be illuminated on the platen 14 regardless of the area of the stereomodel being viewed. Diapositives 18 are mounted between illumination lamps 17 and projectors 16. Projector bar 110 supports the projectors so they may be tilted in absolute orientation by adjusting the leveling screws 19 and 19'.

Now, with reference to FIG. 6, a detailed description of the measurement process will be given. FIG. 6 shows, somewhat schematically, a simple projection stereoplotter of the general type shown in FIG. 5. The developed film from cameras 1, 2, 3, and 4 is referenced as film 1', 2', 3', and 4' for simplicity. The developed film is mounted on simple carriers 21 resting on glass plates, and then placed on tops 18 of the photocarriers 16. The images from cameras 1 and 2 are mounted on the upper or top (as seen in FIG. 6) part of the photo carriers, with image 1' on the left and image 2' on the right photocarrier. These images are mounted emulsion down, and when viewed at the tracing table 23 by the operator, will form an enlarged, three-dimensional, and correctly oriented image of the entire front of the log load.

The images from cameras 3 and 4 are mounted on the lower or bottom portion of the photocarriers, upside down, or emulsion up, and when viewed at the tracing table will form an enlarged, three-dimensional, and correctly oriented image of the entire rear of the log load. In other words, the position of a log which appears in the lower left bottom of the load in the front picture will also appear in the lower left bottom of the rear picture. This simplifies the operator's task of making sure that his measurements are being performed front and rear on the same log.

Of key importance to this process is the previously mentioned, predetermined orientation of the taking cameras. When these have been satisfied, the same geometric conditions will exist in the front and rear stereomodels and the operator will be able to view both the front and back of each load without having to adjust for the standard orientation elements of kappa, (swing or rotation around the axes of the lenses) Phi, (tip of the cameras) or Omega (tilt of the cameras).

A reference mark 50, or "measuring mark", exists in the stereoplot system. It is introduced through a small backlit pinhole of light being in the center of platen 14 on the tracing table 23. The motions of this measuring mark can be controlled by moving the tracing table by hand in either the x (left or right) direction, Y (front to back or close to far) direction, or the Z (from the horizon up and down or vertical) direction. In the Y direction, the tracing table platen is moved up and down by means of a thumbwheel. These measuring marks are inherent to all stereoplotters in current use. The measuring mark, when introduced into a three-dimensional view, such as we have when viewing a stereomodel of a log load, enables the operator to place the mark on or trace (and therefore measure and record the position of) any part of any object, falling either near or far, within the stereomodel.

Here, the movement of the measuring mark is monitored through the use of conventional encoders 60 and digitizers 70 with the output thereof being fed to a conventional digital computer 80. The absolute position of the measuring mark on the stereomodel ca thus be monitored to within a thousandth of an inch. A computer program has been developed which guides the operator through the measurement process and performs all the necessary computations based on the requisite XXX values.

To initially register the three-dimensional images the computer will prompt the operator to move the measuring mark to the void space between the upper and lower stereomodels (between the images of the front and back of the load) and, through the use of a switch 90, signal the computer when that position has been reached. The computer program will then recognize that any subsequent measurements having a greater value in the Z direction will be applicable to the front of the load, while those having a lesser value in Z will apply to the rear of the load.

Included in each stereomodel is an image of the targets (T1, T2, etc. as seen in FIG. 4) whose positions have previously been determined by ground survey and entered into the computer program. The operator will be prompted to place the measuring mark on each of these targets, signal the computer, and identify the target number. At the conclusion of this phase, the computer will generate the exact x-y-z scales for the individual log measurements which will follow.

The computer will now prompt the operator to move to the front or the top of the stereomodel (the image of the front of the load) and use the measuring mark to determine the diameter of the of the first selected log. As these measurements are being done, (the diameters are measured twice at different locations to determine the average diameter) the program is determining both the average diameter of the log, and the average distance the front end of the log was from the camera station.

The average diameter figure is displayed immediately on the computer screen and the operator is then prompted to move the measuring mark to the rear or bottom stereomodel (the back of the load) and record the diameter of that end of the same log. The program then determines the average diameter of the rear end of the log, as well as the average distance that the end of the log was from the rear cameras. The total length of the log is now calculated by simply subtracting the sum of the distances from the cameras to the logs from the total distance between cameras. This figure is displayed on the screen followed by the computed volume figures.

This procedure is repeated until all logs on the load have been processed. The program then displays and prints a complete summary of the total volume of the logs on the load.

The process is repeatable at a later date, as the film can be recalled for viewing, auditing purposes, or verification of any previous measurement.

From the foregoing description, one skilled in the art can easily ascertain the essential characteristics of this invention, and without departing from the spirit and scope thereof, can make various changes and modifications of the invention to adapt it to various usages and conditions.

Upon further study of the specification and appended claims, further objects and advantages of this invention will become apparent to those skilled in the art.

I claim:

1. Apparatus for measuring the length of individual items in a group of items, so arranged together in bundles, that access to or vision of said individual items is limited to the viewing of their ends, said apparatus comprising:
   (A) two sets of stereocameras for photographing each visible ends of said individual items thus capturing two film images of each said visible end;
   (B) means for analysing said film images to accurately determine said length, wherein said means for analysing includes cross-sectional determining means so as to allow a further determination of the volume of said individual items.

2. The apparatus of claim 1, wherein said items are logs piled on a log transport vehicle.

3. The apparatus of claim 1, wherein said items are logs in the process of being unloaded from a log transport vehicle.

4. The apparatus of claim 1, wherein said items are logs in the process of being unloaded from a transport vehicle.

5. The apparatus of claim 1, wherein said means for analysing includes means for mounting all four said film images so as to allow concurrent analysis of both ends of said individual items.

6. The apparatus of claim 5, wherein said means for analysing includes projection means for creating a three-dimensional stereomodel of both ends of said individual items and computer means for translating said three-dimensional stereomodel into spacial position coordinates and computing said length.

7. The apparatus of claim 6, wherein said computer means also uses said spacial position coordinates to determine the cross-sectional areas of said ends of said individual items to further compute the volume.

8. Apparatus for measuring the length and volume of an elongated object in a group of elongated objects, so arranged together in bundles, that access to or vision of said objects is limited to the viewing of their ends comprising:
   (A) first stereocamera sensing means for determining the three-dimensional spacial coordinates of one end of said object with respect to said first sensing means;
   (B) second stereocamera sensing means for determining the three-dimensional spacial coordinates of the other end of said object with respect to said second sensing means, wherein the spacial position of said first and second sensing means with respect to one another is accurately known in advance;
   (C) analysing means for converting said sensed spacial coordinates into data representing cross-sectional area and length for computing said volume.

9. The apparatus of claim 8, wherein said analysing means includes projection means for creating a three-dimensional stereomodel of both ends of said elongated object and computer means for translating said three-dimensional stereomodel into spacial position coordinates and computing said length.

10. The apparatus of claim 8, wherein said elongated object is a log and said volume data represents the volume of lumber exclusive of bark.

11. A method of manufacturing an object in a group of objects, so arranged together in bundles, that access to or vision of said objects is limited to the viewing of their ends comprising the steps of:
- (A) sensing the light waves from one entire end of said object with first depth perceptive stereocamera sensing means;
- (B) sensing the light waves from the other entire end of said object with second depth perceptive stereocamera sensing means;
- (C) computing the length of said object, based upon the information obtained from said first and second sensing means and predetermined information as to the distance between said first and second sensing means, by using analysing means;
- (D) computing the cross-sectional areas of each end of said object based upon information obtained from said first and second sensing means;
- (E) computing the volume of said object based upon said length and said cross-sectional areas, using said analysis means.

12. The method of claim 11, wherein said object is elongated, and said analysing means comprises stereo projection means, digitized tracing and calibration means, and a digital computer for both guiding the tracing and performing said computing.

13. The method of claim 11, wherein said object is a group of similar objects, comprising a load of logs on a transport vehicle, and said sensing steps (A) and (B) can be accomplished without causing delay to said vehicle.

14. The method of claim 13, wherein said sensing steps are done at the time said vehicle is being unloaded.

15. The method of claim 11, wherein said first and second sensing means produce a permanent record such that the measurement can be reproduced and verified at any later time.

* * * * *